US007482542B2

(12) United States Patent
Galtier

(10) Patent No.: US 7,482,542 B2
(45) Date of Patent: Jan. 27, 2009

(54) FEEDER DEVICE WITH AN INTEGRATED DIFFERENTIAL WEIGH MODULE

(75) Inventor: Olivier Galtier, Paris (FR)

(73) Assignee: NEOPOST Technologies, Bagneux (FR)

( * ) Notice: Subject to any disclaimer, the term of this patent is extended or adjusted under 35 U.S.C. 154(b) by 234 days.

(21) Appl. No.: 11/172,411

(22) Filed: Jun. 30, 2005

(65) Prior Publication Data

US 2006/0000648 A1 Jan. 5, 2006

(30) Foreign Application Priority Data

Jun. 30, 2004 (FR) .................................. 04 07199

(51) Int. Cl.
*G01G 19/413* (2006.01)

(52) U.S. Cl. ......................... 177/25.15; 705/407; 271/2

(58) Field of Classification Search .............. 177/25.15; 705/406-407; 271/2
See application file for complete search history.

(56) References Cited

U.S. PATENT DOCUMENTS 5,001,648 A * 3/1991 Baker ......................... 705/407
5,220,970 A * 6/1993 Bachmann .................. 177/178
2003/0204477 A1 10/2003 McNett ...................... 705/406
2005/0267849 A1* 12/2005 Jacobson et al.

FOREIGN PATENT DOCUMENTS

EP 1 431 924 A2 12/2003
EP 1 431 725 A2 6/2004

* cited by examiner

*Primary Examiner*—Randy W Gibson
(74) *Attorney, Agent, or Firm*—Sughrue Mion, PLLC

(57) ABSTRACT

A mail article feeder device having a weighing cell for delivering a weighing signal, a receiver tray having longitudinal and transverse walls for jogging mail articles, and for receiving a stack of mail articles, and an automatic extractor for ejecting mail articles from the stack one by one. The automatic extractor and the receiver tray are carried by the weighing cell, the feeder device further including an intrusion detector for detecting any intervention by an operator on the elements or mail articles.

9 Claims, 4 Drawing Sheets

FEEDER DEVICE WITH AN INTEGRATED DIFFERENTIAL WEIGH MODULE

CROSS-REFERENCE TO RELATED APPLICATIONS

This application claims priority from French Patent Application No. 04 07199, filed on Jun. 30, 2004.

FIELD OF THE INVENTION

The present invention relates to the specific field of processing mail. It relates more particularly to a mail article feeder device for a postage meter, and including a differential weigh module.

PRIOR ART

Differential weigh modules for use with postage meters are well known. U.S. Pat. No. 5,001,648 illustrates one particular example. Such devices serve to weigh articles on the fly and comprise a weighing tray (constituting a receiver magazine) that includes a load sensor and on which there stands a stack of mail articles. For weighing purposes, the operator removes each mail article manually and the difference in weight measured by the scales before and after an article is withdrawn is forwarded to the postage meter which then determines the postage value as the operator takes the article in question from the scales to the postage meter.

It is entirely possible to make a mail article. feeder device that has a differential weigh module integrated therein and that is directly connected to the inlet of a postage meter, however that raises a technical difficulty. During normal operation of such a feeder, the operator needs to act on the stack of mail articles, either to nudge articles into moving during processing, or else to reload the magazine. The weighing of the stack of mail articles is then potentially disturbed by the operator and must be interrupted during periods of refilling.

OBJECT AND DEFINITION OF THE INVENTION

The invention proposes mitigating that drawback with a mail article feeder device that integrates a differential weigh module that enables weighing to be performed continuously, and thus that enables mail articles to be fed at particularly high rates. An object of the invention is also to provide the operator with information in the event of invalid weighing.

These objects are achieved by a mail article feeder device comprising: a support housing receiving a weighing cell for delivering a weighing signal; a receiver tray including longitudinal and transverse walls for jogging mail articles, and suitable for receiving a stack of mail articles; and automatic extractor means for ejecting the mail articles from the stack one by one; wherein the automatic extractor means and the receiver tray are carried by the weighing cell, and wherein the device further includes intrusion detector means for detecting operator intervention on any of the elements carried by the weighing cell, including said stack of mail articles.

Thus, with this automatic feeder device in which any contact with the mail articles or the elements on which they are supported or stand, will have an influence on the weighing cell, it becomes possible to accept refills in operation. Refilling is not prohibited, it merely defers acquisition of weight for as long as the operator is intervening.

The intrusion detector means may comprise at least one optical cell constituted by an emitter and a receiver, or indeed at least one ultrasound sensor constituted by an emitter and a receiver.

In a first embodiment, said intrusion detector means comprise three optical cells. disposed at each of the outside corners of said receiver tray so as to form a triangular protection surface in front of the mail articles. The first optical cell comprises both an emitter mounted on said longitudinal wall for jogging mail articles near its top outside corner and a receiver mounted on said transverse jogging wall near its top outside corner; the second optical cell comprises firstly an emitter mounted on said transverse wall for jogging mail articles near its top outside corner and secondly a receiver mounted on said receiver tray near its front outside angle; and the third cell comprises firstly an emitter mounted on said receiver tray near its front outside corner and secondly a receiver mounted on said longitudinal jogging wall near its top outside corner.

In a second embodiment, said intrusion detector means comprises a plurality of optical cells disposed in parallel beams between two parallel transverse walls of said support housing placed around said automatic extractor means and said receiver tray carried by said weighing cell.

In the intended configuration, the device further includes processor means for calculating the weight of each extracted mail article as a function of weighing signals delivered by the weighing cell before and after extraction of said mail article by said automatic extractor means.

Advantageously, the device further includes format detector means for detecting the format of extracted mail articles. Said format detector means comprise means for detecting the length of the mail article and means for detecting the width of the mail article.

BRIEF DESCRIPTION OF THE DRAWINGS

Other characteristics and advantages of the present invention appear better from the following description made by way of non-limiting indication and with reference to the accompanying drawings, in which.

DETAILED DESCRIPTION OF A PREFERRED EMBODIMENT

A mail processor machine is conventionally constituted by at least three modules that are functionally independent but electrically interconnected: a mail article feeder module; a weigh module; and a franking module.

Such a machine can be used to frank mail articles of different formats up to a determined thickness limit, e.g. 16 millimeters (mm), corresponding to the height of a slot for inserting mail articles into the franking module.

Figure 1:
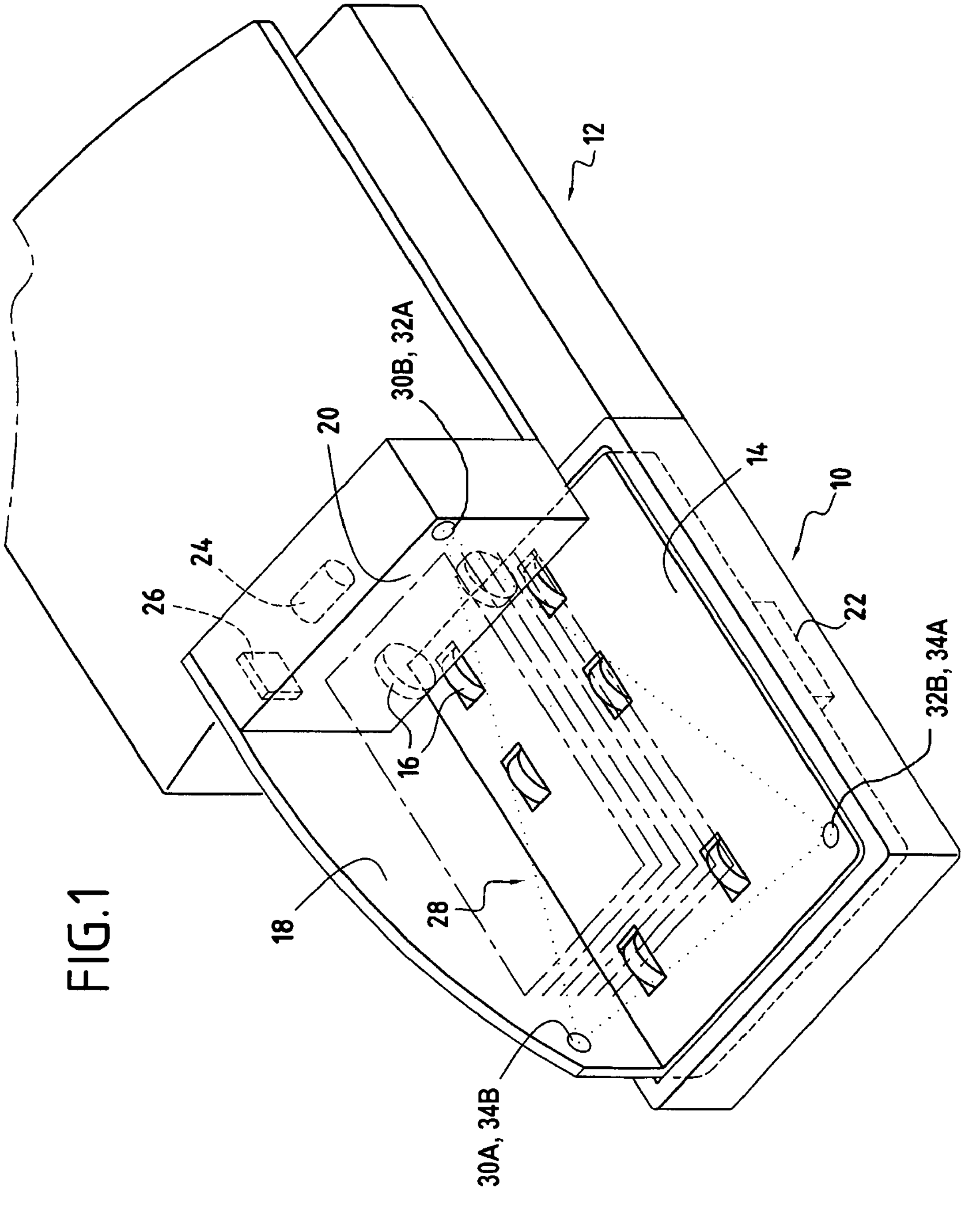
FIG. 1 is a perspective view of a first embodiment of the invention for feeding a mail processor machine and integrating a differential weigh module.
Figure 2:
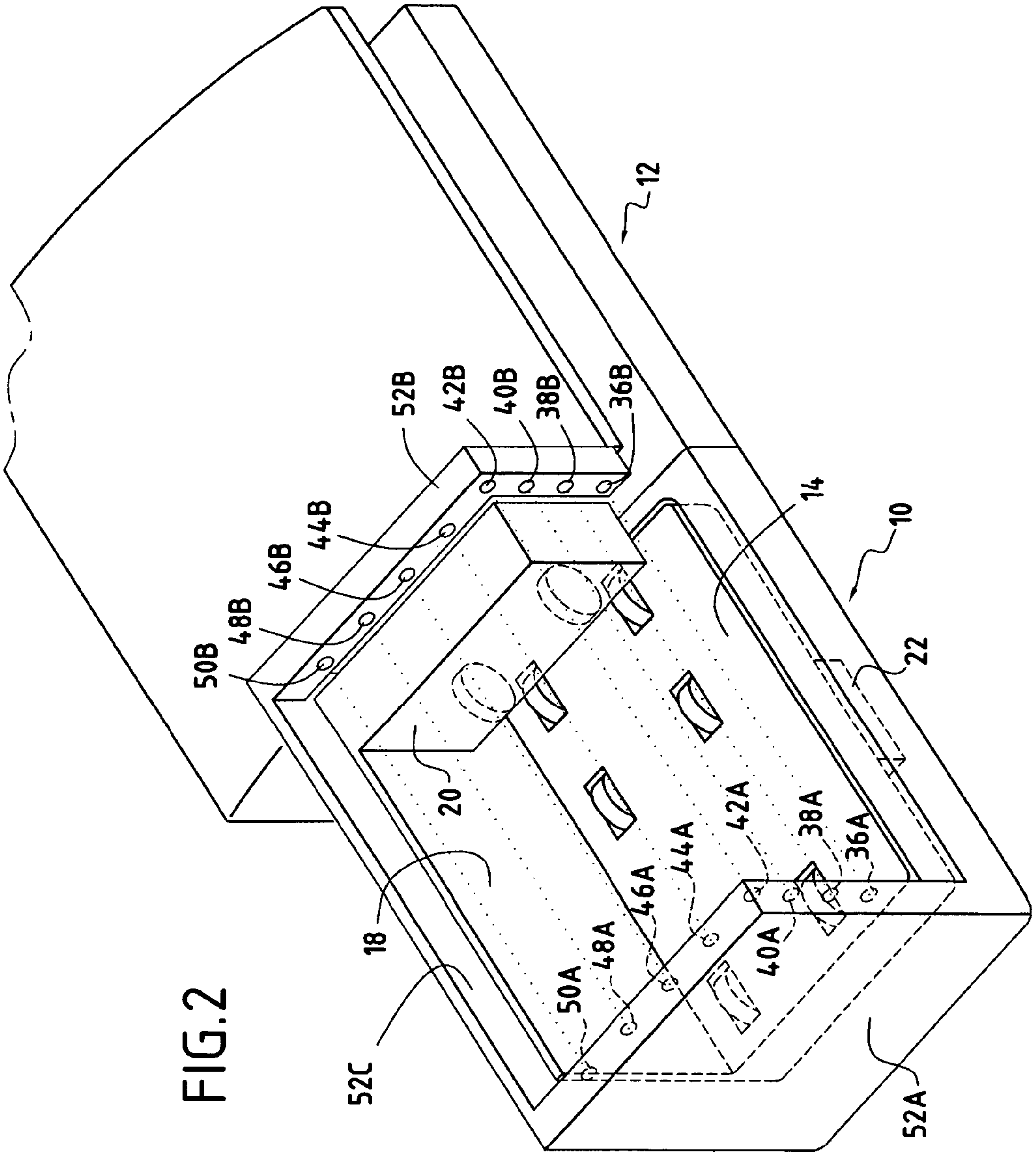
FIG. 2 is a perspective view of a second embodiment of the invention for feeding a mail processor machine and integrating a differential weigh module.
Figure 2A:
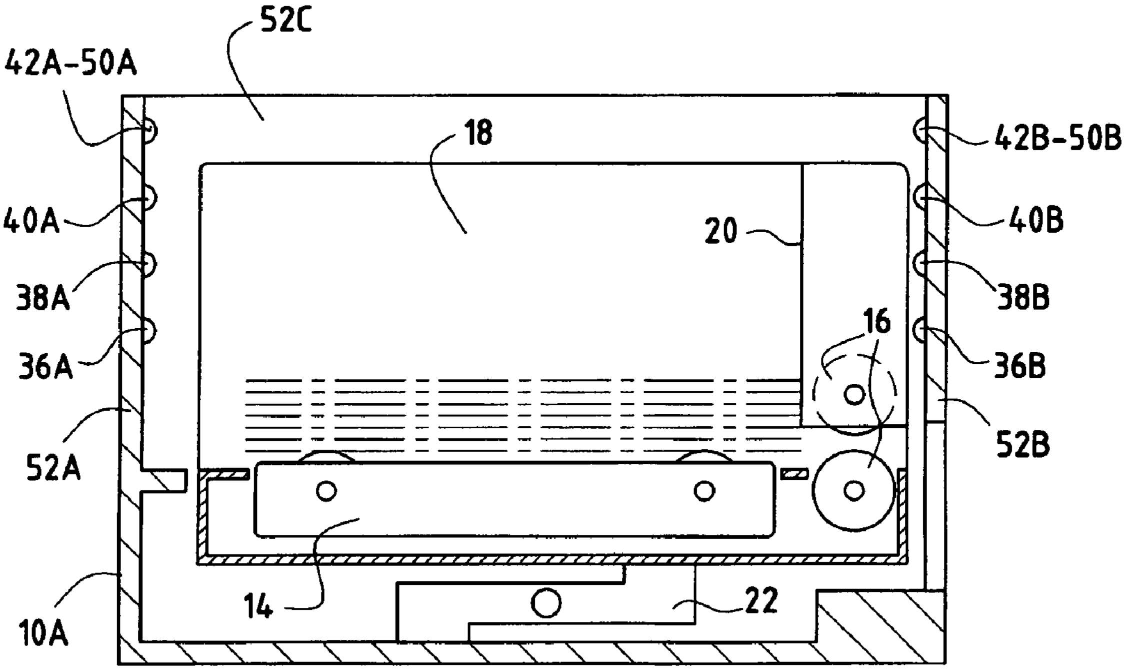
FIG. 2A is a longitudinal section view of the FIG. 2 feeder.

As shown in FIGS. 1 and 2, the mail article feeder module and the differential weigh module form a single device 10 disposed at the inlet to the module for franking these mail articles (franking machine 12).

In the invention, the feeder device includes a receiver tray 14 on which there stands the stack of mail articles, together with automatic extractor means 16 (preferably wheels) for transporting and ejecting mail articles towards the franking module 12, once weighing has been performed. The receiver tray has longitudinal and transverse jogging walls 18 and 20 for accurately positioning mail articles ready for weighing using the known principle of differential weighing by means of a weighing cell 22 (typically of the type comprising load sensors such as strain gauges). In order to ensure that weighing is accurate, not only the mail articles but also all of the elements in contact therewith, i.e. the receiver tray and the extractor means, are supported by said weighing cell which is in turn carried by a support housing 10A of the feeder device. This eliminates any false weighing results of the kind that can arise in prior-art differential weighing modules due to contact between the mail articles and the jogging walls.

The extractor means are conventionally driven by a drive motor 24, advantageously an electric motor, under the control of processor means 26, preferably comprising a microprocessor with associated software, that also serves to manage the weight data supplied by a weighing signal from the weighing cell. It should be observed that the processor means are not necessarily integrated in the feeder device but could be constituted merely by the processor means of the franking module.

Depending on the use to which it is put, the weighing module may also include format detector means (not shown) connected to the processor means and serving to supply it with data relating to the length and the width of the current mail article, i.e. the format of the mail article. In certain countries such as the United States, Germany, or Great Britain, the format of a mail article, like its weight, constitutes a component involved in calculating the amount of postage to be franked. Nevertheless, it should be observed that these format detector means may equally well be located directly in the franking module.

The feeder device also includes means 28 for detecting operator intervention on the stack of mail articles while said stack is being refilled, or merely during any voluntary contact (removing an article, or jogging manually, for example), or any involuntary contact with said stack of mail articles. These extrusion detector means are advantageously of the light-beam type and may be implemented by one or more optical cells each constituted by an emitter and a receiver, with the passage of the operator's hand, a mail article, or any other object that interrupts reception of the signal thus changing the state of the receiver.

In the embodiment of FIG. 1, the light barrier is constituted by three optical cells 30A & 30B, 32A & 32B, and 34A & 34B located in each outside corner of the feeder device so as to form a triangular protection surface in front of the mail articles. The emitter 30A of the first cell is mounted on the longitudinal wall 18 for jogging the mail articles near the top outside corner thereof, and the receiver 30B is mounted on the transverse jogging wall 20 near its top outside corner. The emitter 32A of the second optical cell is mounted on the transverse wall 20 for jogging mail articles near its top outside corner, and the receiver 32B on the receiver tray 14 near its front outside corner. The emitter 34A of the third cell is mounted on the receiver tray 14 near its front outside corner, and the receiver 34B is mounted on the longitudinal jogging wall 18 near its top outside corner.

In the embodiment of FIG. 2, the support housing 10A is provided with a U-shaped partition wall having two parallel transverse walls 52A and 52B interconnected by a longitudinal wall 52C placed around the receiver tray 14 and the automatic detector means 16, and a plurality of optical cells 36A-50B are mounted thereon to operate as parallel beams between the two transverse walls. This light barrier thus located at the inlet to the feeder device serves to monitor completely all access of the operator to any of the elements carried by the weigh cell (receiver tray and extractor means) and in particular to the mail articles.

Unlike a full cover with closure of the cover being monitored by a sensor, both of these embodiments allow the feeder device to be refilled while it is in operation. The invention does not exclude refilling, but merely defers weight acquisition, preferably for some minimum duration, so long as the operator is intervening. Advantageously, the feeder device includes visual or audible indicator means for warning the operator that the franking machine is unavailable for as long as the operator is intervening. Naturally, such indicators may be those of the franking module, for example its display screen.

Figure 3:
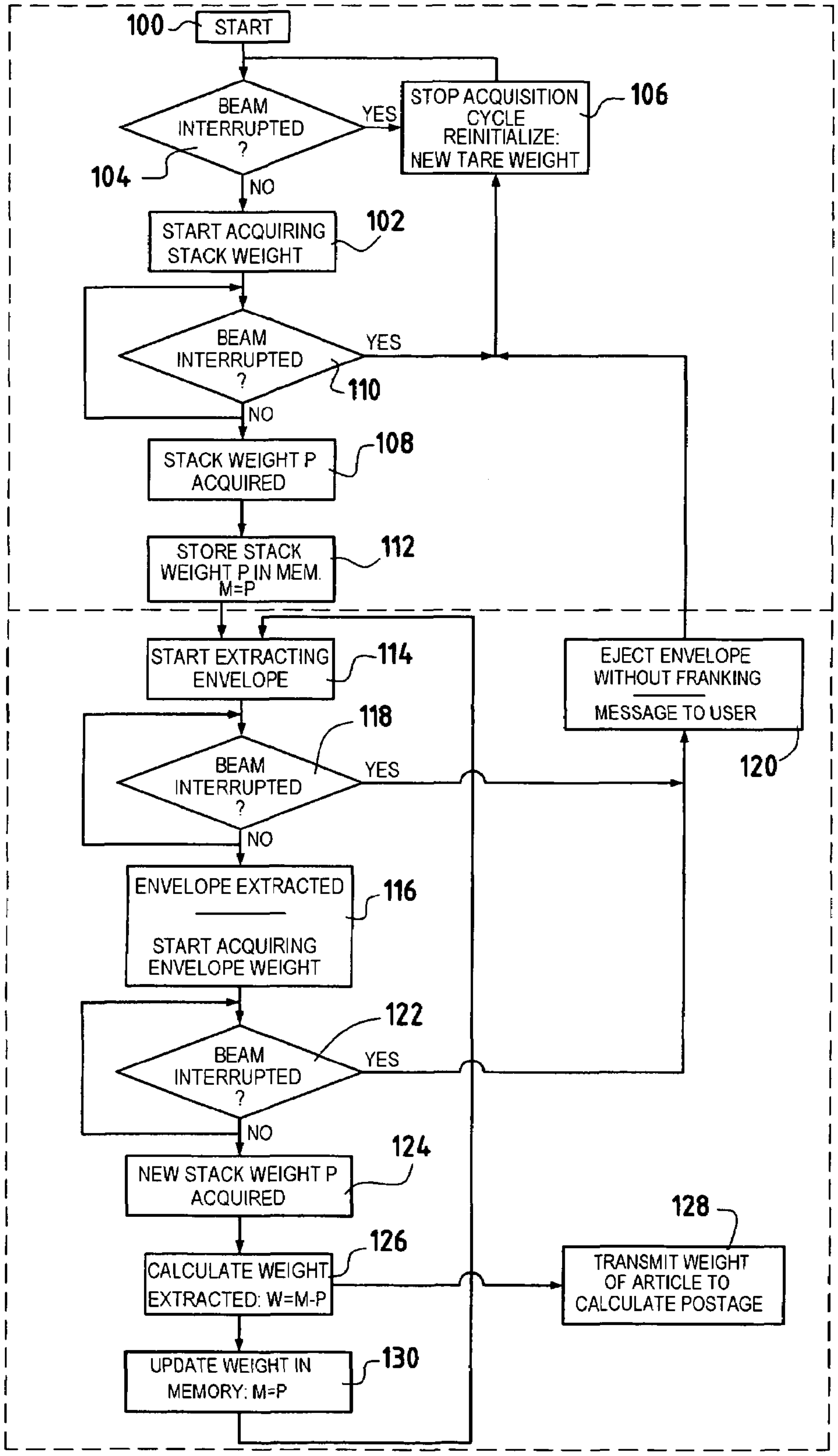
FIG. 3 is a flow chart showing the differential weighing method implemented in the feeder of the invention.

The operation of the automatic feeder device is described below in greater detail with reference to the flow chart of FIG. 3.

Initially, the operator places a first stack of mail articles on the receiver tray of the automatic feeder device and puts this device and the franking module into operation in a first step 100.

Once in operation, the differential weighing process is engaged in a step 102, unless the continuous scanning of the state of the optical cells shows that a beam has been interrupted (test in step 104), in which case the weight acquisition cycle is immediately stopped in a step 106. When a beam is interrupted, a message is sent to the processor means 26 controlling synchronization of envelope departures and signal acquisitions from the weighing sensor.

The acquisition cycle is restarted as soon as the beam is reestablished and it terminates in a following step 108, unless the continuous scanning of the state of the optical cells again shows that a beam has been interrupted (test in step 110), in which case the weight acquisition cycle is stopped immediately and the process returns to step 106. Once the acquisition cycle has been completed, the resulting weight corresponding to the weight of the stack of mail articles is stored in a memory in a new step 112.

The mail article at the bottom of the stack can then be extracted in a step 114, with the end of this extraction in a following step 116 initiating acquisition of the weight of the extracted mail article, unless the continuous scanning of the state of the optical cells shows once more that a beam that has been interrupted (test in step 118), in which case the mail article is ejected immediately without being franked and a corresponding message is sent to the operator by the visual or audible indicator means in a step 120, and the process returns to step 106 for a new step of acquiring the weight of the stack without the ejected mail article.

Once acquisition of the weight of a mail article has begun, only a new beam interruption (test in step 122) can cause the mail article to be ejected without being franked and the process to return to step 106 after passing through the above-described step of informing the operator 120. If no such interruption occurs, the end of the cycle for acquiring the new weight of the stack (minus the extracted article) is completed in a step 124, the weight of the extracted article is determined in the following step 126 by taking the difference between the two previously obtained weights, and this weight difference is forwarded to the franking module in order to determine the postage amount to be franked in step 128. All that then remains to be done is to update the weight of the stack in a final step 130 prior to returning to step 114 in order to extract a new mail article.

It can thus be seen that interrupting a light beam has different consequences on the weighing process depending on whether the interruption occurs before or after the end of the acquiring the weight of the stack of mail articles. If it occurs before, the interruption leads to a new weight acquisition process, whereas if it occurs after, it also causes the article to be ejected without being franked and issues a warning to the operator, since the mail article must not be franked given that its weight cannot be determined.

Naturally, the present invention is not limited strictly to the sole embodiments described. Thus, although optical cells are described above as constituting the detector means, each comprising an emitter facing a receiver, it is also possible to envisage optical cells comprising a common emitter/receiver assembly facing a mirror type reflection system. Similarly, light detector means could advantageously be replaced by any other analogous device suitable for performing such detection. Thus, ultrasound detectors could be used or image detector/analyzers could be used (with suitable analysis software), for example.

What is claimed is:

1. A mail article feeder device for a postage meter comprising:

- a housing constructed to support a weighing cell, said weighing cell constructed to generate a weighing signal;
- a receiver tray including longitudinal and transverse walls for jogging mail articles, and suitable for receiving a stack of mail articles;
- an automatic extractor for ejecting the mail articles from the stack one by one, and wherein the automatic extractor and the receiver tray are carried by the weighing cell, and wherein the device further includes;
- an intrusion detector for detecting operator intervention on the receiver tray and generating a signal indicative of said intrusion; and
- a processor for calculating the weight of each extracted mail article as a function of weighing signals delivered by the weighing cell before and after extraction of said mail article by said automatic extractor, and wherein the processor is adapted to receive the signal from the intrusion detector and in response to said intrusion detector signal, interrupt the weight calculation;
- wherein said intrusion detector comprises three optical cells disposed at each of the outside corners of said receiver tray so as to form a triangular protection surface in front of the mail articles, the optical cells including an emitter and a receiver.

2. A device according to claim 1, wherein the first optical cell comprises both an emitter mounted on said longitudinal wall for jogging mail articles near its top outside corner and a receiver mounted on said transverse jogging wall near its top outside corner; wherein the second optical cell comprises firstly an emitter mounted on said transverse wall for jogging mail articles near its top outside corner and secondly a receiver mounted on said receiver tray near its front outside angle; and wherein the third cell comprises firstly an emitter mounted on said receiver tray near its front outside corner and secondly a receiver mounted on said longitudinal jogging wall near its top outside corner.

3. A device according to claim 1, wherein said intrusion detector comprises a plurality of optical cells disposed in parallel beams between two parallel transverse walls of said support housing placed around said automatic extractor and said receiver tray carried by said weighing cell.

4. A device according to claim 1, wherein said intrusion detector comprise at least one ultrasound sensor constituted by an emitter and a receiver.

5. A device according to claim 1, further including a format detector for detecting the format of extracted mail articles.

6. A device according to claim 5, wherein said format detector comprise means for detecting the length of the mail article and means for detecting the width of the mail article.

7. The device according to claim 1 wherein said interruption is maintained until the intrusion detector signal is cleared.

8. The device according to claim 1, wherein the processor is further adapted to generate a warning to a user that the weight calculation is interrupted in response to receiving the signal from the intrusion detector.

9. A method of detecting interference in a mail stack of a franking machine comprising:

- constructing a housing to support a weighing cell, said weighing cell constructed to generate a weighing signal;
- mounting a receiver tray including longitudinal and transverse walls for jogging mail articles, and suitable for receiving a stack of mail articles, said receiver tray further comprising an automatic extractor for ejecting the mail articles from the stack one by one, wherein the automatic extractor and the receiver tray are carried by the weighing cell;
- detecting operator intervention on any of the receiver tray, automatic extractor, or mail articles carried by the weighing cell and generating a signal indicative of said intrusion, said step of detecting operator intervention being performed by three optical cells disposed at each of the outside corners of said receiver tray so as to form a triangular protection surface in front of the mail articles, the optical cells including an emitter and a receiver; and
- calculating the weight of each extracted mail article as a function of weighing signals delivered by the weighing cell before and after extraction of said mail article by said automatic extractor using a processor, the processor receiving the signal from the intrusion detector and in response to said intrusion detector signal, interrupt the weight calculation.

* * * * *